(12) United States Patent
Ohms

(10) Patent No.: US 10,288,204 B2
(45) Date of Patent: May 14, 2019

(54) QUICK CONNECT APPARATUS FOR PLUMBING FIXTURE

(71) Applicant: Gabe Ohms, Camas, WA (US)

(72) Inventor: Gabe Ohms, Camas, WA (US)

(73) Assignee: Dura Global Sourcing Inc., Camas, WA (US)

( * ) Notice: Subject to any disclaimer, the term of this patent is extended or adjusted under 35 U.S.C. 154(b) by 79 days.

(21) Appl. No.: 14/324,477

(22) Filed: Jul. 7, 2014

(65) Prior Publication Data

US 2016/0003392 A1    Jan. 7, 2016

(51) Int. Cl.
*F16L 37/252* (2006.01)
*F16L 37/40* (2006.01)

(52) U.S. Cl.
CPC .......... *F16L 37/252* (2013.01); *F16L 37/40* (2013.01)

(58) Field of Classification Search
CPC ......... F16L 37/252; F16L 37/40; F16L 37/24; F16L 37/248; F16L 37/413; F16L 37/42; F16L 37/44; F16K 1/00
USPC ..................................................... 251/149.6
See application file for complete search history.

(56) References Cited

U.S. PATENT DOCUMENTS

| | | | | | |
|---|---|---|---|---|---|
| 2,255,333 | A | * | 9/1941 | Scheiwer | ............... F16L 37/23 251/149.6 |
| 3,583,667 | A | * | 6/1971 | Amneus, Jr. | .......... F16L 37/113 251/149.5 |
| 3,777,771 | A | * | 12/1973 | De Visscher | ........... F16L 29/04 137/1 |
| 5,560,548 | A | * | 10/1996 | Mueller | ............... B05B 1/1663 239/442 |
| 6,209,804 | B1 | * | 4/2001 | Spriegel | ............... F16L 33/223 239/373 |
| 6,394,132 | B1 | * | 5/2002 | Walcome | ................ F16L 37/35 137/614 |
| 7,293,584 | B1 | * | 11/2007 | Hubmann | ............. B05B 7/2443 137/614.02 |
| 2004/0238777 | A1 | * | 12/2004 | Yang | ..................... F16L 37/252 251/149.6 |

FOREIGN PATENT DOCUMENTS

| | | | | | |
|---|---|---|---|---|---|
| DE | 202012011751 | U1 | * | 1/2013 | ............... F16L 37/413 |
| EP | 1375996 | A1 | * | 1/2004 | .............. F16L 37/23 |
| EP | 1489345 | A1 | * | 12/2004 | .............. F16L 37/23 |
| EP | 1704923 | A1 | * | 9/2006 | ........... B05B 9/0861 |
| GB | 1437395 | A | * | 5/1976 | .............. F16L 37/23 |

* cited by examiner

*Primary Examiner* — Marina A Tietjen
(74) *Attorney, Agent, or Firm* — Jacob Ong, Ongs Law Firm PLLC

(57) ABSTRACT

A quick connect apparatus for plumbing fixtures comprises a base assembly and adaptor assembly and allows plumbing fixtures to quickly be attached (or unattached) to an external shower box or well housing. Numerous watertight seals provide confidence to the user that the quick connect plumbing apparatus will not be wasting water through unnecessary leaks.

7 Claims, 8 Drawing Sheets

QUICK CONNECT APPARATUS FOR PLUMBING FIXTURE

BACKGROUND OF THE INVENTION

The present invention generally relates to exterior shower box assembly for RVs and boats and more specifically relates to the attachment of plumbing fixtures to a shower box.

SUMMARY OF THE INVENTION

The present invention allows a plumbing fixture to be quickly installed and uninstalled to an exterior shower box assembly, which are often used in RV and marine applications. The installation and uninstallation are manual; no tools are needed. The leak proof base assembly of the present invention mounts to the mixing bowl of a faucet assembly or water well. The adaptor assembly can then be connected to the base assembly allowing any number of plumbing fixtures to be attached such as showerheads, spay nozzles, extenders, etc.

DETAILED DESCRIPTION

Figure 1:
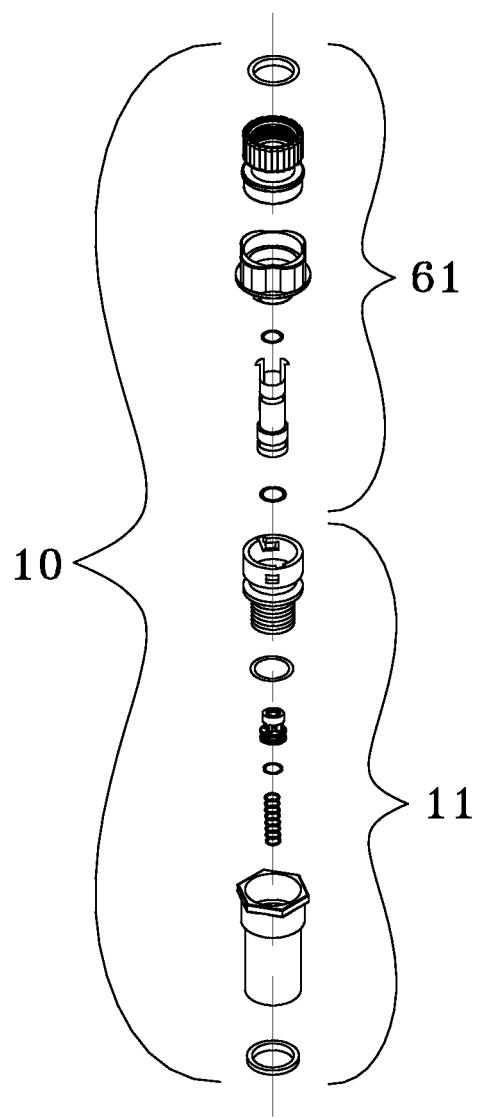
FIG. 1 is an exploded view of the quick connect plumbing fixture apparatus of the present invention.
Figure 2:
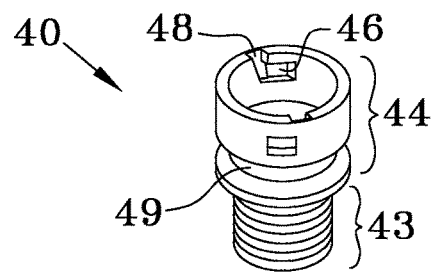
FIG. 2 is a perspective view of the seat of the present invention.
Figure 3:
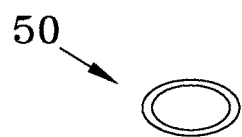
FIG. 3 is a perspective view of the seat O-ring of the present invention.
Figure 4:
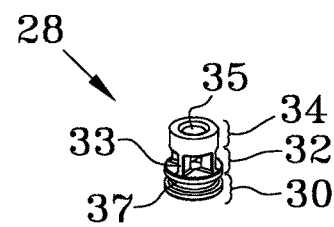
FIG. 4 is a perspective view of the flow-director of the present invention.
Figure 5:
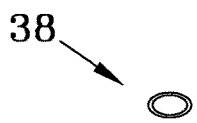
FIG. 5 is a perspective view of the flow-director O-ring of the present invention.
Figure 6:
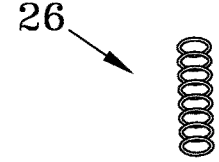
FIG. 6 is a perspective view of the spring of the present invention.
Figure 15:
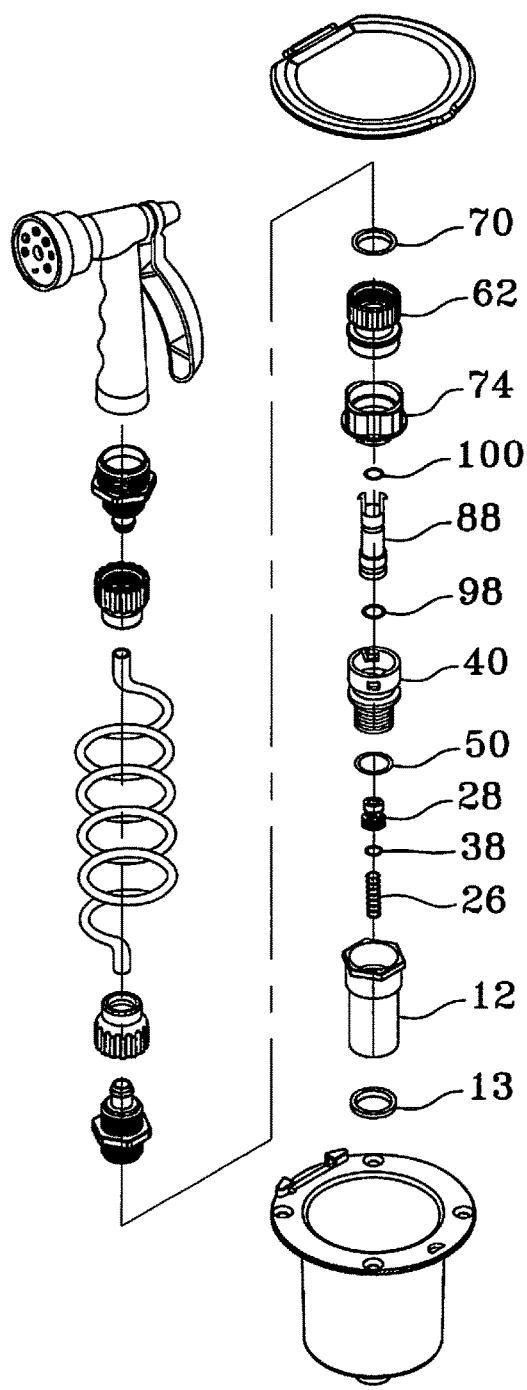
FIG. 15 is an exploded view of a spray nozzle assembly featuring the quick connect apparatus for plumbing fixtures of the present invention.

Looking at FIGS. 1 & 15 the quick connect apparatus for plumbing fixtures is shown. Apparatus 10 generally includes a base assembly 11 and adaptor assembly 61. Base assembly 11 comprises seat 40, seat O-ring 50, flow-director 28, flow-director O-ring 38, spring 26, base 12, and base O-ring 13, illustrated in FIGS. 2-8, respectively.

Base assembly 11 makes a mechanical connection via a female National Pipe Thread Taper (NPT) or other threaded profiles as may be found on the threaded boss of water spigots or mixing bowls. Looking at FIGS. 7-21 base-end threads 15 reside around the interior of the base-end 14 of base 12, and begin part way up the interior recess of base-end 14 (distal end), so as to leave a smooth interior sealing face 17. Base O-ring 13 resides (is retained on) the water outlet below the NPT threaded boss creating a first watertight seal between the smooth sealing face 17 at base-end 14 and the base O-ring 13 on the water outlet to which base 12 it is attached.

Figure 7:
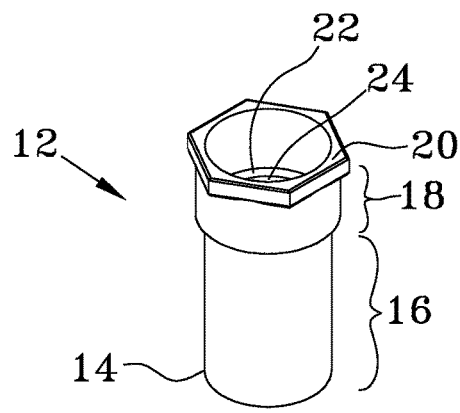
FIG. 7 is a perspective view of the base of the present invention.
Figure 8:
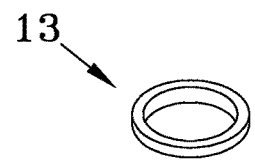
FIG. 8 is a perspective view of the base O-ring of the present invention.
Figure 9:
FIG. 9 is a perspective view of the connector O-ring of the present invention.
Figure 10:
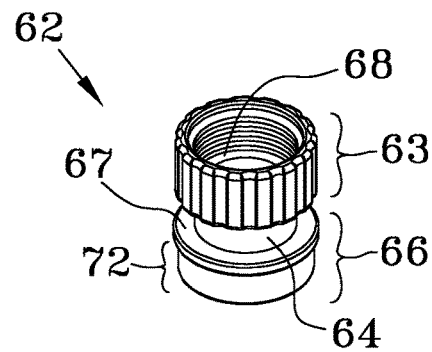
FIG. 10 is a perspective view of the connector of the present invention.
Figure 11:
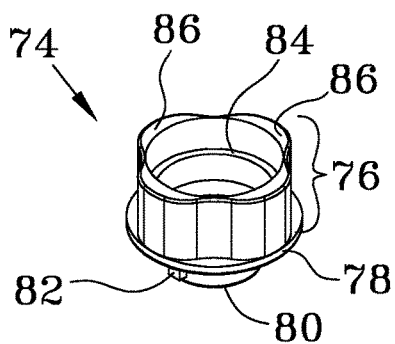
FIG. 11 is a perspective view of the retainer of the present invention.
Figure 12:
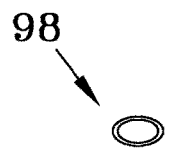
FIG. 12 is a perspective view of the first flow-connector O-ring of the present invention.
Figure 13:
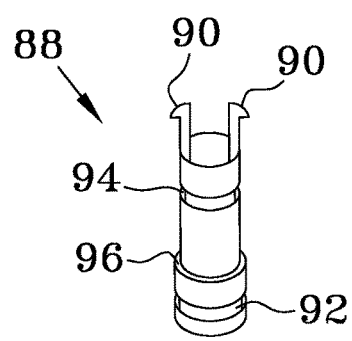
FIG. 13 is a perspective view of the flow-connector of the present invention.
Figure 14:
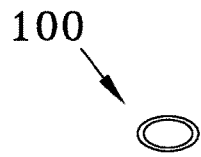
FIG. 14 is a perspective view of the second flow-connector O-ring of the present invention.
Figure 20:
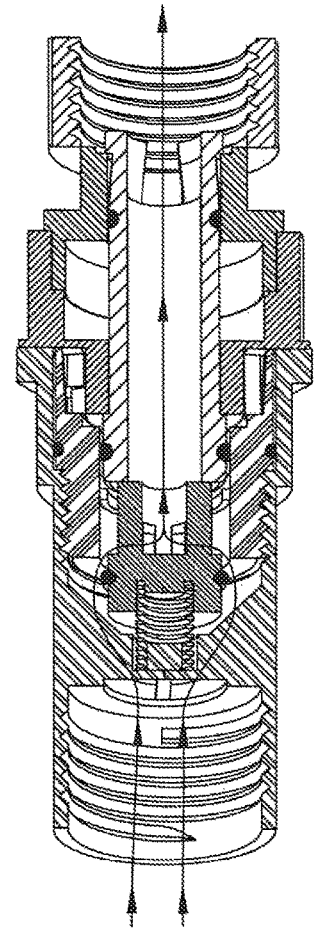
FIG. 20 is a partial cross-sectional view of the quick connect to aid in illustrating fluid flow through the apparatus.
Figure 21:
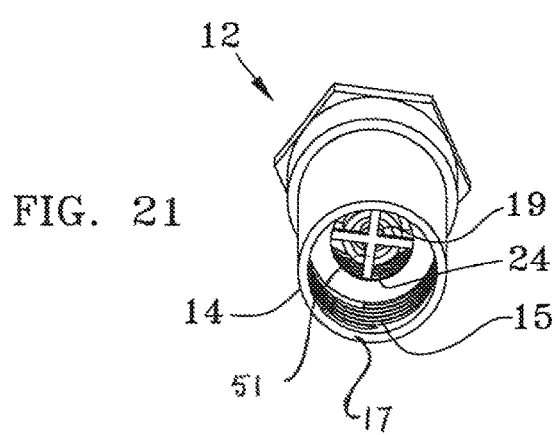
FIG. 21 is a bottom perspective view of the base of the quick connect apparatus for plumbing fixtures of the present invention.

Still looking at FIGS. 7 & 21, base 12 is generally a hollow cylindrical body comprising three integral coaxial sections: base-body 16, base-neck 18, and base-collar 20. Base-body 16 is smaller in diameter than base-neck 18. As illustrated in FIG. 7 base-collar 20 is hexagonal in cross-section to facilitate accepting a wrench. Partially visible in FIG. 7 is neck-lip 22, which occurs at the interface of base-body 16 and base-neck 18. Just below neck-lip 22 are internal mid-threads 24. Mid-threads 24 are designed to threadingly retain seat assembly within base 12 at base 12's approximate longitudinal center. Mid-threads 24 are also visible in FIG. 19-21.

Spring 26 is held at a first end with its vertical axis oriented parallel to the vertical axis of base-body 16 via a circular restraint 19 (See FIGS. 19, 21) located within base-body 16. Spring 26 (at its second end) matingly engages flow-director 28 via a circular recessed seat 21 within flow-director base 30 (see FIG. 19). As is visible in FIG. 21 circular restraint 19 is formed at the intersection of perpendicular cross-bars 51. Flow-director base 30 contains and annular grove 37 for the mating engagement of flow-director O-ring 38. Flow-director 28 has an open mid-section 32 comprising four columns 33 (columns 33 can also be thought of as ports) connecting flow-director base 30 to flow-director head 34. A circular orifice 35 extends through head 34 of flow-director 28 so as to create a flow-path between the open mid-section 32 and the circular orifice 35. Flow-director base 30 is larger in diameter than flow-director head 34.

Seat 40 is generally a hollow cylindrical body comprising two integral coaxial sections: threaded seat-base 43 and seat-head 44. Seat-head 44 contains two opposing, rectangular orifices 46 there-through and two tapered channels 48 adjacent orifices 46 such that opposing orifices/channels 46 reside in a mirrored image configuration. Below orifices 46 is seat-groove 49 designed for the mating engagement (retention) of seat O-ring 50. Seat O-ring 50 serves as base assembly fluid seal when seat 40 assembly is threadingly engaged within said base 12. Seat assembly is seat 40 combined with seat O-ring 50. Flow-director 28 is slidingly engaged within seat assembly.

To assemble base assembly 11, flow-director O-ring 38 is secured within annular grove 37 of flow-director 28 (Flow director O-ring forms a seal preventing fluid flow between the flow-director 28 and the base 12 when there is no mating locking engagement between the base assembly 11 and the adapter assembly 61.) Next, spring 26 is secured about its second end within the circular recessed seat 21 (visible in FIGS. 19 & 20) within flow-director base 30, and then flow-director 28 is placed within base-body 16 until the first end of spring 26 contacts the circular restraint 19 (See FIG. 19) within base-body 16. Next, seat O-ring 50 is secured within seat-groove 49, and threaded-seat base 43 is placed over flow-director 28 until the external threads of the threaded-base 43 contact mid-threads 24. Seat-head 44 is then pressed down (depressing spring 26) while being rotated clockwise until the top of seat-head 44 resides flush with the top of base-collar 20. When seat 40 is properly seated within base 12, open mid-section 32 and flow-director head 34 extend through the center of seat 40, and seat O-ring 50 resides just above lip 22 creating a second watertight seal, while the base of open mid-section 32 contacts an annular internal flange (See FIG. 19) located within seat-base 43 creating a third watertight seal. Base assembly 11 is now ready to be secured to a water outlet.

Turning to FIGS. 9-15, adaptor assembly 61 comprises a connector 62, a connector O-ring 70, retainer 74, flow-connector 88, a first flow-connector O-ring 98, and a second flow-connector O-ring 100. Connector 62 comprises three integral coaxial sections: a connector head 63, connector neck 64, and connector base 66. Connector head 63 is internally threaded as is visible in FIG. 10. Connector neck 64 is smaller in diameter than connector head 63 and accordingly an interior connector lip 68 resides at the internal junction of connector head 63 and connector neck 64. Connector O-ring 70 resides on connector lip 68 creating a fourth watertight seal when connector head 63 is secured to a coupling assembly or directly to a plumbing fixture.

Connector base 66 comprises a shoulder 67 and insertion portion 72. Insertion portion 72 is designed to be retained within retainer 74. Retainer 74 comprises three integral coaxial sections: retainer head 76, retainer disk 78, and retainer base 80. Retainer disk 78 separates retainer head 76 from retainer base 80, and retainer base 80 is smaller in diameter than retainer head 76. Retainer lip 84 resides around an interior surface of retainer head 76. The exterior surface of retainer head 76 comprises four lobes 86, giving retainer head 76 a four-leaf clover geometry in cross-section. Two rectangular tabs 82 extend from an exterior surface of retainer base 80. Tabs 82 are spaced 180° apart and are designed for retention within orifices 46 of seat 40.

Flow-connector 88 is a hollow cylindrical body (longitudinal orifice extends through the body) with two retention prongs 90 at a top end and a first flow-connector groove 92 at its bottom end. Second flow-connector groove 94 resides below retention prongs 90 and flow-connector shoulder 96 resides between first flow-connector groove 92 and second flow-connector groove 94. First flow-connector O-ring 98 resides within first flow-connector groove 92, while second flow-connector O-ring 100 resides within second flow-connector groove 94. The bottom end of flow-connector 88 contacts flange 23 when engaged when adaptor assembly 61 is matingly engaged with base assembly 11.

To assemble adaptor assembly 61, first flow-connector O-ring 98, and second flow-connector O-ring 100 are placed within their respective grooves (92, 94). Next connector 62 is inserted into the retainer head 76 (of retainer 74) such that insertion portion 72 contacts retainer lip 84. Flow-connector 88 is then inserted through connector head 63 until retention prongs 90 engage an interior ledge 93 (See FIG. 19) located at the interface of connector head 63 with connector neck 64 below connector lip 68. Finally, connector O-ring 70 is placed within connector 62 until in contacts connector lip 68. Once assembled, adaptor assembly 61 is extremely difficult to separate into its constituent parts. As assembled, adaptor assembly 61 is connected to base assembly 11 via a bottom end (the end with first flow-connector O-ring 98) and when engaged with base assembly 11, first flow-connector O-ring 98 serves to form a seal allowing fluid to pass between said adapter assembly 61 and said base assembly 11 when there is mating locking engagement between base assembly 11 and adapter assembly 61. First flow-connector O-ring 98 can be thought of as an adaptor assembly 61 sealing O-ring. A fifth watertight seal is formed between second flow-connector O-ring 100 at the interior wall of the junction of connector neck 64 and connector base 66.

To connect base assembly 11 with adaptor assembly 61, tabs 82 are aligned with tapered channels 48 and a downward force is applied to adaptor assembly 61, causing tabs 82 to slide down tapered channels 48. Once tabs 82 can slide no farther, adaptor assembly 61 is rotated clockwise, locking tabs 82 within orifices 46. It should be noted that as a downward force is applied to adaptor assembly 61, flow-connector 88 is engaging flow-director 28, depressing spring 26. It is also important to note that connector 62 and retainer 74 rotate around flow-connector 88 independently from one another, allowing connector head 63 to be tightened (or loosened) from a plumbing fixture or secondary adaptor device without causing the adaptor assembly 61 to disengage from base assembly 11. To disengage adaptor assembly 61 from base assembly 11, retainer 74 is simply rotated counterclockwise until tabs 82 disengage orifices 46. A sixth watertight seal is formed between first flow-connector O-ring and the interior wall of seat base 43.

Turning to FIG. 20 a partial cross-sectional view of apparatus 10 is illustrated, and illustrates water flow through apparatus 10. As locking tabs 82 of retainer 74 are locked into rectangular orifices 46 flow-connector 88 engages flow-director 28. As spring 26 is compressed, flow-director 28 moves downward into the interior of base-body 16, as flow-director O-ring disengages from the interior wall of seat 40. Water flows into chamber 53 around open mid-section 32 of flow-director 28 and through open orifice 35 into flow-connector 88 and can pass up through connector-head 63. It should be noted that connector O-ring 70 has been omitted from FIGS. 19 & 20 for visual clarity.

When adaptor assembly 61 is twisted so as disengage locking tabs 82 from rectangular orifices 46, flow-connector 88 is pushed up as tabs slide up channels 48 to break the seal formed between first flow-connector O-ring 98 and the interior wall of seat 40, as adapter assembly 61 disengages from base assembly 11. Flow-director 28 is pushed up by spring 26 until flow director base 30 contacts internal flange 23, and flow-director O-ring 38 is engaged on interior wall of seat 40 (seventh watertight seal); base assembly 11 is now watertight. The constituent parts (O-rings excluded) of the quick connect apparatus 10 can be made from any suitable thermoplastic(s) or a combination of thermoplastics such as acrylonitrile butadiene styrene (ABS) and polyoxymethylene (POM).

Figure 16:
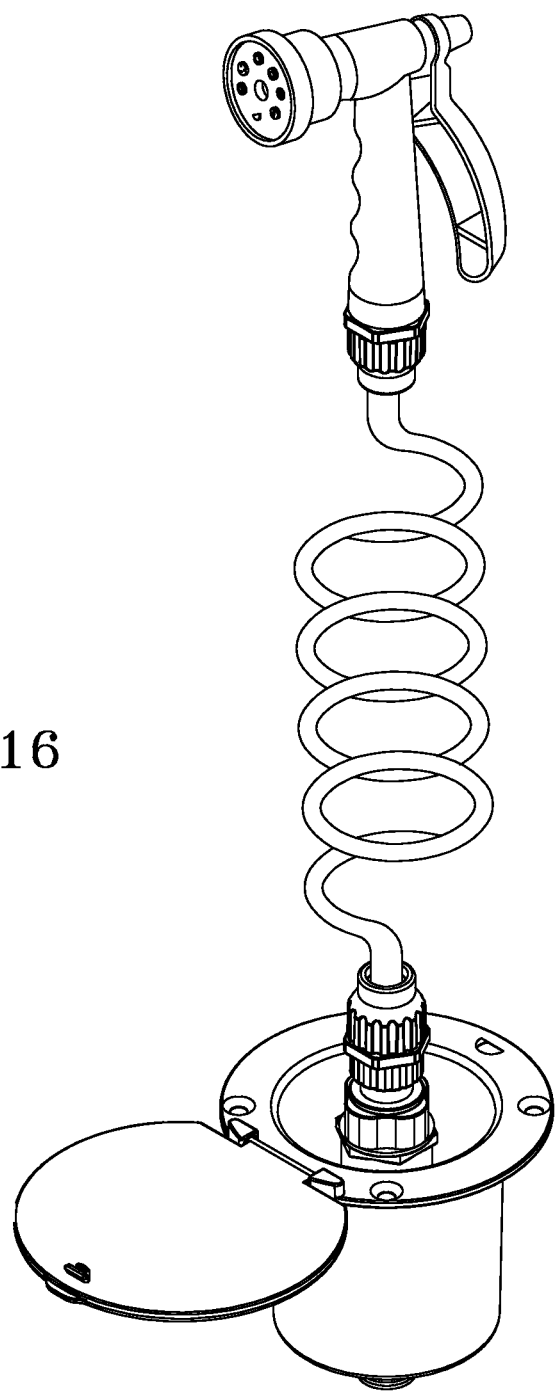
FIG. 16 is a perspective view of a spray nozzle assembly featuring the quick connect apparatus for plumbing fixtures of the present invention.
Figure 17:
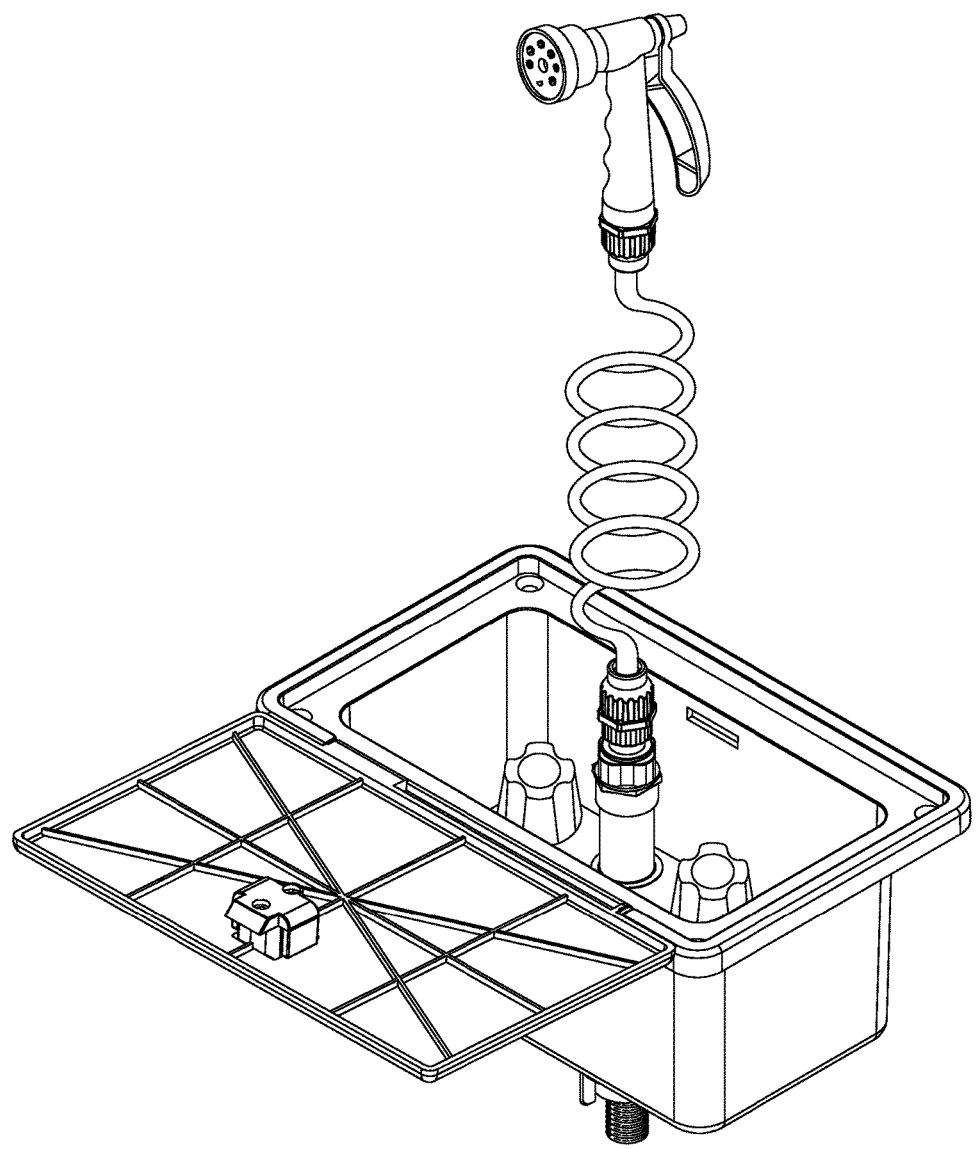
FIG. 17 is a second perspective view of a spray nozzle assembly featuring the quick connect apparatus for plumbing fixtures of the present invention.
Figure 18:
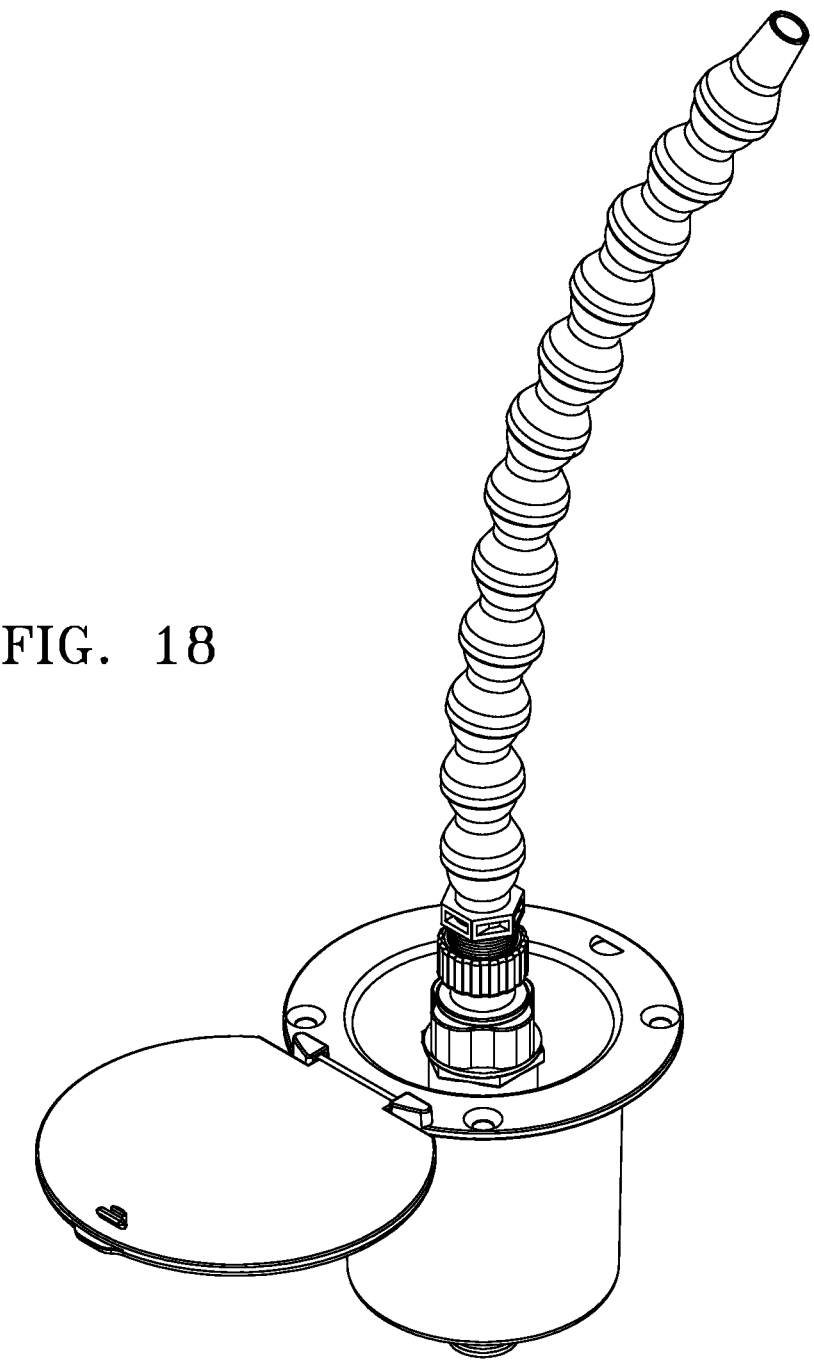
FIG. 18 is perspective view perspective view of an extender assembly featuring the quick connect apparatus for plumbing fixtures of the present invention.
Figure 19:
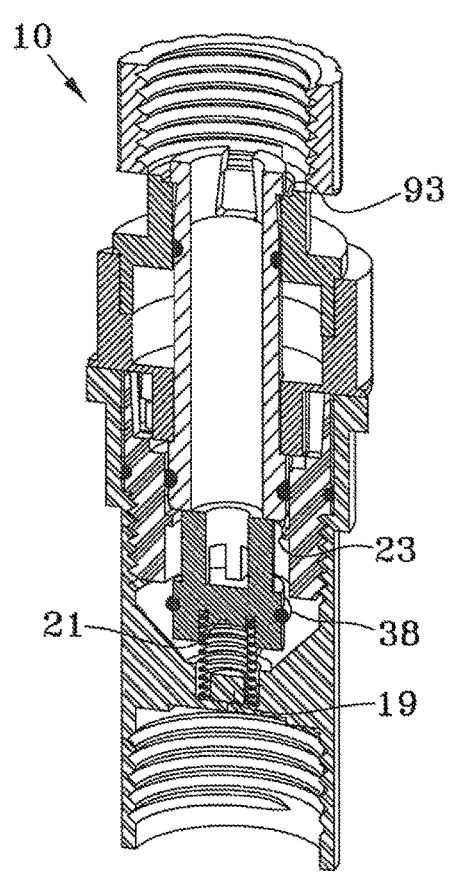
FIG. 19 is a perspective cross-sectional view of the quick connect apparatus for plumbing fixtures of the present invention.

FIG. 15 is an exploded view illustrating the quick connect apparatus 10 of the present invention connected to a well housing and nozzle assembly. FIG. 16-18 illustrate the quick connect apparatus 10 of the present invention in use. Apparatus 10 allows a RV or boating enthusiast the flexibility to quickly attached plumbing fixtures to an exterior shower box or well housing, and/or quickly alter his/her plumbing fixtures.

I claim:

1. A quick connect apparatus for fluid flow comprising:
a base assembly comprising a base O-ring forming a first seal, a first flow director O-ring forming a second seal, and a seat O-ring forming a third seal;
a fourth watertight seal, wherein the fourth watertight seal is formed by a connector O-ring residing on a connector lip creating a fourth watertight seal when a connector head is secured to a coupling assembly or directly to a plumbing fixture;
a fifth watertight seal, wherein the fifth watertight seal is formed between a second flow-connector O-ring at the interior wall of a junction of a connector neck and a connector base;
a sixth watertight seal, wherein the sixth watertight seal is formed between the first flow-connector O-ring and the interior wall of a seat base;
a seventh watertight seal, wherein the seventh watertight seal is formed when a flow-director is pushed up by a first spring until a flow director base contacts an internal flange and the flow-director O-ring is engaged on a interior wall of a seat;
wherein said base assembly has a distal end adapted for mechanical connection with a water supply and a proximate end adapted for mating lockable engagement with a first end of an adapter assembly by compression of a second spring housed in said base assembly, said adapter assembly having a second end adapted for mechanical connection with the plumbing fixture.

2. The quick connect apparatus for fluid flow of claim 1 wherein said base assembly comprises:
a cylindrical base comprising three integral coaxial sections of a base-body, a hollow base-neck, and a base-collar, said base-body having a first internal thread formed therein beginning at a distal end of the base-body and terminating at a first side of an interior circular restraint, said circular restraint having a set of perpendicular cross bars formed thereon, and said base-body having a second internal mid-thread formed therein beginning at a second side of said circular restraint and extending to the base-neck, said mid-thread adapted for threaded engagement with an externally threaded seat base, said base-neck having a smooth inner face with an internal lip extending thereon; and wherein said base collar is hexagonally configured at the proximal end of said base for receiving a wrench;
wherein said base O-ring contacts a distal end of said base body;
the first spring;
the seat O-ring;
a hollow cylindrical seat body located at the proximal end of said base assembly, said seat body having a first integral coaxial section comprising a threaded seat-base and a second integral coaxial section comprising a seat-head wherein the seat-head comprises
a first rectangular orifice area;
a second rectangular orifice area, the first rectangular orifice area opposing the second rectangular orifice;
a first tapered channel area adjacent to the first rectangular orifice area; and,
a second tapered channel area adjacent to the second rectangular orifice area;
said seat body having a smooth wall internal bore with an interior flange formed thereon;
the flow director O-ring;
the flow-director having a flow director base with an annular groove adapted for the retention of said flow director O-ring, the flow director having an open midsection comprising four columns, said columns attaching said flow director base to a flow director head, said flow director head having a circular orifice, said flow director base having a circular recessed seat formed on its bottom face, and
wherein said spring is located between said recessed seat on said flow director base and said circular restraint of said base body is configured such that said flow director is slidingly housed within said seat and forms a second half of said third seal with said interior flange of said seat assembly, and
wherein said flow-director O-ring is engaged between said flow-director and said smooth walled internal bore so as to form said seventh seal preventing fluid flow between said flow-director and said base assembly when said base assembly and said adapter assembly are not matingly engaged.

3. The quick connect apparatus for fluid flow of claim 2 wherein seat O-ring retained on an outer surface of said seat sealingly engages between said base and said seat when said seat is threadingly engaged with said base.

4. The quick connect apparatus for fluid flow of claim 3 wherein said adapter assembly comprises:
the connector O-ring;
the connector having three integral coaxial sections, an internally threaded connector head, a connector neck having a internal lip at the junction of said connector neck and connector head, and a connector base below said connector neck, having a shoulder and insertion portion sized for retention within a retainer;
a retainer having a four lobed exterior surfaced retainer head and a retainer base, separated by a retainer disk, said retainer head having an internal retainer lip, said retainer base having two tabs extending from an exterior surface thereof spaced substantially 180 degrees part and configured for mating engagement with said first and second orifices of said seat;
the first flow connector O-ring;
the second flow connector O-ring;
the flow-connector having a hollow cylindrical body defining a longitudinal orifice, the flow-connector having
at least two retention prongs positioned at a proximal end of said flow-connector,
a first flow connector groove positioned at a distal end for the retention of said first flow connector O-ring,
a second flow connector groove residing below said at least two retention prongs for the retention of said second flow connector O-ring,
wherein a bottom end of said flow connector contacts said flange of said seat when said adapter assembly is matingly engaged with said base assembly.

5. The quick connect apparatus for fluid flow of claim 4 wherein said flow-connector has a top end recessed within said adapter assembly and a bottom end extending therefrom said adapter assembly, said bottom end having a face that contacts a top face of said interior flange of said seat.

6. The quick connect apparatus for fluid flow of claim 5 wherein said flow-director is of a generally stepped cylindrical configuration having a top end and a bottom end, said bottom end of a larger diameter than said top end and housing said flow-director sealing O-ring thereon, and having a shoulder that contacts a bottom face of said interior flange of said seat assembly.

7. The quick connect apparatus for fluid flow of claim 4 wherein said interior flange of said seat has a top face and a bottom face, said flange serving as part of two separate seals, only one of which said seals are sealing at the same time.

\* \* \* \* \*